United States Patent [19]

Kohlhammer

[11] Patent Number: 5,399,621
[45] Date of Patent: Mar. 21, 1995

[54] PROCESS FOR THE PREPARATION OF A GRAFT COPOLYMER LATEX OF CORE/SHELL DISPERSION PARTICLES HAVING IMPROVED PHASE BINDING BETWEEN CORE AND SHELL

[75] Inventor: Klaus Kohlhammer, Marktl, Germany

[73] Assignee: Wacker-Chemie GmbH, Munich, Germany

[21] Appl. No.: 160,620

[22] Filed: Dec. 2, 1993

[30] Foreign Application Priority Data

Dec. 3, 1992 [DE] Germany .................. 42 40 744.2

[51] Int. Cl.6 .............. C08F 4/30; C08F 4/32; C08F 255/00; C08F 259/00; C08F 261/06; C08F 263/02; C08F 265/04; C08F 257/00

[52] U.S. Cl. ................. 525/263; 525/245; 525/264; 525/302; 525/308; 525/309; 525/312; 525/317; 525/902

[58] Field of Search .............. 525/263, 264, 245, 309, 525/317, 312, 302, 308, 902

[56] References Cited

U.S. PATENT DOCUMENTS

| | | |
|---|---|---|
| 3,436,440 | 4/1969 | Abe . |
| 3,773,699 | 11/1973 | Bergmeister et al. . |
| 4,246,355 | 1/1981 | Bolto . |
| 5,187,233 | 2/1993 | Ball et al. . |
| 5,304,609 | 4/1994 | Kohlhammer et al. ........... 525/309 |
| 5,314,964 | 5/1994 | Lucas .................. 525/293 |

FOREIGN PATENT DOCUMENTS

| | | |
|---|---|---|
| 829843 | 12/1969 | Canada . |
| 0231933 | 8/1987 | European Pat. Off. . |
| 2027991 | 10/1970 | France . |
| 2376873 | 8/1978 | France . |
| 3743142 | 6/1989 | Germany . |
| 4000543 | 7/1991 | Germany . |
| 4006643 | 9/1991 | Germany . |
| 4135984 | 5/1993 | Germany . |

OTHER PUBLICATIONS

Derwent-Abstract AN 86-25600s (JP-A 61/185518) (Aug. 1986).
Derwent-Abstract AN 91-268112/37 (1991).
Derwent-Abstract AN-91-209287/29 (1991).

*Primary Examiner*—Vasu S. Jagannathan
*Attorney, Agent, or Firm*—Burgess, Ryan & Wayne

[57] ABSTRACT

The invention relates to the preparation of a graft copolymer latex of core/shell dispersion particles having improved phase binding between core and shell in a two-stage emulsion polymerization process, hydroperoxide groups being produced at the particle surface of the grafting base prior to grafting by hydrogen peroxide treatment.

9 Claims, No Drawings

PROCESS FOR THE PREPARATION OF A GRAFT COPOLYMER LATEX OF CORE/SHELL DISPERSION PARTICLES HAVING IMPROVED PHASE BINDING BETWEEN CORE AND SHELL

BACKGROUND OF THE INVENTION

1) Field of the Invention

The invention relates to the preparation of a graft copolymer latex of core/shell dispersion particles having improved phase binding between core and shell in a two-stage emulsion polymerization process, dispersions and graft copolymers prepared by the process and the use thereof.

2) Background Art

The preparation of particulate graft polymers with the aid of two-stage emulsion polymerization is known. In this process, a polymer dispersion is produced in a first stage with the aid of emulsion polymerization and then, in the second stage, a shell of another polymer is grafted onto said polymer dispersion by metering in the conventional initiators and further monomers. This process is also used, inter alia, for grafting elastomeric polymer dispersion particles, which are characterized in particular by a glass transition temperature of less than 0° C., with hard monomers. Such a procedure is described in DE-A 3743142 for the graft polymerization of vinyl chloride onto an ethylene/vinyl acetate rubber. In the preparation of all these particulate graft polymers synthesized in two-stage processes, the main problem is the binding of the graft shell to the grafting base. In the case of insufficient phase binding, the mechanical properties of the corresponding moldings are in fact generally unsatisfactory. The prior art has already disclosed a number of measures for improving the phase binding.

EP-A-231933 describes the use of so-called graftlinking monomers. By definition, these are polyfunctional monomers having a plurality of C=C double bonds of different reactivities, not all of which react in the free radical polymerization of the first stage and some of which are therefore available in the second stage for binding to the monomers to be grafted. The disadvantage here is that some of these polyfunctional monomers also act as crosslinking agents in the first polymerization stage. In addition, it is frequently observed that the less reactive double bonds have a retardant effect in the first reaction stage. Consequently, these graft-linking monomers cannot be introduced in any desired amounts into the grafting base.

The use of hydroxyalkyl acrylates as comonomers in the grafting base for improving the grafting rate is claimed in DE-A 4006643. The disadvantage of this process is that, owing to their copolymerization parameters, the hydroxyalkyl acrylates proposed there cannot be copolymerized with all vinyl monomers in the first stage.

The use of copolymerizable peroxide initiators which are copolymerized in the first stage together with the monomers of the grafting base to give a so-called macroinitiator which can initiate a graft polymerization in the second stage without further addition of initiator has already been described many times in the patent literature, for example in DE-A 4135984 and in the literature cited therein. The disadvantage of all these processes is the expense in the copolymerization in the first stage to give the macroinitiator, in which care must be taken to ensure that the peroxide functions are not destroyed.

In the process of DE-A 4000543, the "in situ" generation of a particulate macroinitiator having hydroperoxide groups at the particle surface is claimed. For this purpose, a grafting base produced in emulsion is treated with water-soluble peroxides and atmospheric oxygen. According to this publication, hydroperoxide groups form on the particle surface, which groups can be activated in the grafting step of the second stage with the aid of a reducing agent and finally act as anchor groups for the polymer shell grafted on. The disadvantage of this process is the use of molecular oxygen, which, owing to its diradical character, is known to have a retardant effect in free radical reactions and therefore must be removed by an expensive procedure before the subsequent graft polymerization.

It was therefore the object of the invention to develop a process for the preparation of particulate graft copolymers having improved binding between the grafting base and the graft shell, by means of which the disadvantages of the abovementioned procedures can be avoided.

SUMMARY OF THE INVENTION

The invention relates to a process for the preparation of a graft copolymer latex of core/shell dispersion particles having improved phase binding between core and shell in a two-stage emulsion polymerization process, a latex based on one or more monomers from the group comprising (meth)acrylates of alcohols having 1 to 14 C atoms, vinyl esters of saturated aliphatic carboxylic acids having 1 to 14 C atoms, olefins, vinyl aromatics, vinyl halides and/or vinyl ethers being prepared in the first stage, wherein a) hydrogen peroxide and a free radical initiator which decomposes into free radicals with a half-life of >48 hours at the temperature of the latex at the time of addition of the hydrogen peroxide are added to the polymer latex of the first stage simultaneously or in any order and b) in the second stage, this mixture is heated to a temperature at which the free radical initiator decomposes into free radicals with a half-life of <48 hours and/or a reducing agent is added and c) after the addition of the graft monomer phase which contains one or more monomers which form homopolymers having a glass transition temperature $T_g$ of >20° C., the latex polymer is grafted, if necessary together with further reducing agent.

DESCRIPTION OF THE PREFERRED EMBODIMENTS

Preferred base monomers from the group comprising the methacrylates or acrylates of alcohols having 1 to 14 C atoms are methyl methacrylate, methyl acrylate, ethyl methacrylate, ethyl acrylate, isopropyl methacrylate, isopropyl acrylate, tert-butyl acrylate, n-butyl acrylate and ethylhexyl acrylate. The following are preferred from the group comprising the vinyl esters of saturated aliphatic carboxylic acids having 1 to 14 C atoms: vinyl acetate, vinyl 2-ethylhexanoate, isopropenyl acetate, vinyl propionate, vinyl laurate and Versatic acid vinyl esters having 9 or 10 C atoms (vinyl esters of saturated α-branched monocarboxylic acids, commercial product from Shell). Furthermore, ethylene, propylene and 1,3-butadiene are preferred from the group comprising the olefins and vinyl chloride from the group comprising the vinyl halides, and styrene is a preferred vinyl aromatic.

If necessary, the copolymers according to the invention may furthermore contain, as base monomers, up to 10% by weight, based on the copolymer, of ethylenically unsaturated, functional comonomers. Examples of these are mono- or dicarboxylic acids, such as methacrylic acid, acrylic acid or fumaric acid and the amides thereof, monomers having hydroxyl functional groups, such as hydroxyethy acrylate, 2-hydroxypropyl acrylate or N-methylolacrylamide, monomers having sulfonate functional groups, such as vinyl sulfonate or 2-acrylamido-2-methylpropane sulfonate, and polyunsaturated monomers, such as divinyl or diallyl esters of saturated or unsaturated $C_4$- or $C_{10}$- dicarboxylic acids, for example divinyl adipate, or triallyl cyanurate.

Copolymers containing one or more comonomers from the group comprising vinyl acetate, isopropenyl acetate, vinyl propionate, vinyl 2-ethylhexanoate, vinyl laurate, vinyl chloride and/or ethylene or crosslinked polybutyl acrylate copolymers are particularly preferred. Copolymers containing 0 to 50% by weight of ethylene, 50 to 100% by weight of vinyl acetate, which are crosslinked in particular with 0.01 to 5.0% by weight of the stated polyunsaturated monomers, are particularly preferred, the data in % by weight summing to 100% by weight.

The latex is preferably prepared by free radical polymerization in emulsion. The polymerization is initiated by free radical initiators in a temperature range from 0° to 90° C. In the preferred emulsion polymerization, initiation is effected by means of water-soluble free radical initiators, which are preferably used in amounts of 0.01 to 3.0% by weight, based on the total weight of the monomers. Examples of these are ammonium and potassium persulfate and peroxodisulfate, hydrogen peroxide and azo compounds, such as azobisisobutyronitrile or azobiscyanovaleric acid. In the thermal initiation, the polymerization is preferably carried out at between 70° and 90° C. At relatively low temperatures, preferably from 30° to 55° C., the free radical formation can be accelerated with the aid of reducing agents, such as alkali metal formaldehyde sulfoxylates, alkali metal sulfites, bisulfites and thiosulfates and ascorbic acid.

All anionic and nonionic emulsifiers conventionally used in emulsion polymerization can be employed as dispersants. 1 to 6% by weight, based on the total weight of the monomers, of emulsifier are preferably used. For example, anionic surfactants, such as alkylsulfates having a chain length, of 8 to 18 C atoms, alkyl and alkylaryl ether sulfates having 8 to 18 C atoms in the hydrophobic radical and up to 40 ethylene oxide or propylene oxide units, alkyl- or alkylarylsulfonates having 8 to 18 C atoms, esters and half esters of sulfosuccinic acid with monohydric alcohols or alkylphenols are suitable. Suitable nonionic surfactants are, for example, alkyl polyglycol ethers or alkylaryl polyglycol ethers having 8 to 40 ethylene oxide units.

The pH range desired for the polymerization, which is in general between 2.5 and 10, preferably between 3 and 8, can be obtained in a known manner by means of acids, bases or conventional buffer salts, such as alkali metal phosphates or alkali metal carbonates. The conventionally used regulators, for example mercaptans, aldehydes and chlorohydrocarbons, can be added for establishing the molecular weight in the polymerization.

The polymerization may be carried out batchwise or continuously, with or without the use of seed latices, with initial introduction of all or individual components of the reaction mixture or with partial initial introduction and subsequent metering of the individual components of the reaction mixture or by the metering method without initial introduction. All metering is preferably effected at the rate at which the particular component is consumed.

In a preferred procedure for the preparation of a latex of the copolymers mentioned as being preferred and containing ethylene and vinyl esters, an ethylene pressure of 10 to 90 bar abs. is established at the beginning of the polymerization and is kept constant by subsequently forcing in ethylene. The vinyl ester comonomer is preferably initially taken in an amount of 5 to 20% by weight and the remainder is metered in in the course of the polymerization. The ethylenically unsaturated, functional comonomers are completely metered in or initially introduced in part and the remainder metered during the polymerization. The emulsifier may be added by any procedure; preferably, some of the emulsifier is initially introduced and the remainder is metered in during the polymerization.

The polymerization of the latex is carried out in such a way that the residual monomer content is less than 1% by weight, based on the total weight of the latex, and a solids content of 20 to 65% by weight results.

To improve the phase binding between grafting base and grafted-on polymer shell, hydroperoxide groups are produced at the particle surface of the latex particles by the process according to the invention, by treatment of the latex polymer with hydrogen peroxide. For this purpose, hydrogen peroxide and a free radical initiator which decomposes into free radicals with a half-life of >48 hours at the temperature of the latex during the hydrogen peroxide treatment are added to the polymer latex, simultaneously or in any order.

Preferably 0.1 to 20% by weight, in particular 0.1 to 10% by weight, based in each case on the weight of the latex polymer of the 1st stage, of hydrogen peroxide are added. The addition is preferably effected at a temperature of the latex of 20° to 40° C., it being possible for the mixture to be left to stand or to be stirred, preferably for a further 30 minutes to 12 hours, in the stated temperature range, after addition of the hydrogen peroxide. In a particularly preferred embodiment, catalytic amounts, preferably 0.001 to 0.01% by weight, based on latex polymer, of salts of heavy metals which may occur in a plurality of oxidation states, for example iron salts such as iron(II) sulfate, are also added together with the hydrogen peroxide.

After the hydrogen peroxide treatment, the mixture is heated to a temperature at which the free radical initiator decomposes into free radicals with a half-life of <48 hours. Alternatively, free radical initiation may also be effected without further heating by adding reducing agent.

Examples of free radical initiators which are suitable for initiating the grafting reaction are watersoluble free radical initiators, such as ammonium persulfate, potassium persulfate, ammonium peroxodisulfate, potassium peroxodisulfate or water-soluble azo compounds such as,, azobisisobutyronitrile or azobiscyanovaleric acid. Suitable reducing agents are those conventionally used in redox initiator systems, such as alkali metal formaldehyde sulfoxylates (Rongalit, Brüggolit), alkali metal sulfites, bisulfites and thiosulfates and ascorbic acid.

The reducing agent and/or the water-soluble free radical initiator are preferably used in amounts of 0.01 to 3.0% by weight, based on the graft monomer phase.

After the hydrogen peroxide treatment, if necessary after the temperature equilibrium has been reached, the monomers to be grafted are metered in, if necessary together with a reducing agent. The graft monomer phase contains one or more monomers which form homopolymers having a glass transition temperature $T_g$ of $>20°$ C. Styrene, vinyltoluene, methyl methacrylate, vinyl chloride or mixtures of these monomers are preferably grafted on. The graft monomers are added in an amount such that the proportion of the grafted polymer shell is 5 to 95% by weight, based on the graft copolymer.

Grafting is carried out at temperatures between 30° and 90° C., depending on the initiator system chosen. If necessary, 0.1 to 5.0% by weight, based on the total weight of the graft copolymer, of the stated nonionic or anionic emulsifiers can also be added for grafting. In a preferred embodiment, reducing agent is subsequently metered after the end of the addition of graft monomer until the residual monomer content is less than 1% by weight, based on the total weight of the latex. The solids content of the graft copolymer dispersions prepared by the process according to the invention is between 20 and 65% by weight, it being possible for the latex to be appropriately diluted with water before the hydrogen peroxide treatment, in order to establish the solids content.

Working up in order to isolate the graft copolymers can be carried out, for example, by spray drying or drum drying or by coagulation with subsequent drying.

The invention furthermore relates to graft copolymer latices and graft copolymers which are prepared by the process according to the invention and have a core, containing one or more monomers from the group comprising the (meth)acrylates of alcohols having 1 to 14 C atoms, vinyl esters of saturated aliphatic carboxylic acids having 1 to 14 C atoms, olefins, vinyl aromatics, vinyl halides and/or vinyl ethers, and a shell comprising one or more monomers which form homopolymers having a glass transition temperature $T_g$ of $>20°$ C. Core/shell dispersion particles whose core consists of crosslinked elastomeric polymers having a glass transition temperature of $T_g<20°$ C. are preferred. Graft copolymers having a crosslinked core containing vinyl acetate and ethylene or a crosslinked core containing butyl acrylate are particularly preferred, the shell being composed of styrene, methyl methacrylate and/or vinyl chloride.

The invention furthermore relates to the use of the graft copolymer latices prepared according to the invention as aqueous binders for the textile sector and in emulsion paints and as adhesives in plasters. The graft copolymers obtainable after the dispersion has been worked up are suitable for use as a thermoplastic molding material for the production of flexible to soft moldings (thermoplastic elastomers), as additives for modification or imparting of phase compatibility in polymer alloys and as "low-profile" additives in UP resins.

In the procedure according to the invention, hydroperoxide groups are produced at the particle surface of the grafting base by the hydrogen peroxide treatment. The grafting reaction is then carried out in the subsequent step by thermal or reductive activation of the hydroperoxide groups. Owing to the free radicals then formed on the particle surface, a higher degree of grafting is inevitably brought about, giving rise, in a directly proportional manner, to the improved mechanical properties of the moldings produced therefrom. Compared with the procedures known from the prior art, the present process has the advantages that the preparation of the grafting base, in contrast to the copolymerization of graft-linking monomers, and the grafting step, in contrast to the copolymerization of macroinitiators, are not made more difficult and, in contrast to the treatment with atmospheric oxygen, no retardant effects occur.

The Examples which follow serve to illustrate the invention further.

EXAMPLE 1

Preparation of a Crosslinked Ethylene/Vinyl Acetate Dispersion as a Grafting Base First, four solutions were prepared:
Initiator solution I: 0.25 part by weight of potassium persulfate was dissolved in 5.5 parts by weight of water.
Initiator solution II: 0.45 part by weight of potassium persulfate was dissolved in 14.6 parts by weight of water.
Monomer solution: 0.45 part by weight of divinyl adipate was dissolved in 90 parts by weight of vinyl acetate.
Preliminary emulsion: 0.8 part by weight of sodium 2-acrylamido-2-methylpropanesulfonate and 2.2 parts by weight of a diisohexyl sulfosuccinate (Aerosol MA80 from Cyanamid) were emulsified in 42 parts by weight of water. In a stirred autoclave, 9.75 parts by weight of vinyl acetate, 0.25 part by weight of vinyl sulfonate and 0.515 part by weight of a diisohexyl sulfosuccinate (Aerosol MA 80 from Cyanamid) were heated to 75° C. and ethylene at 80 bar was added. After the temperature equilibrium had been reached, the initiator solution I described above was added in the course of 10 minutes and the three further solutions were metered. The metering rates were chosen to correspond to a metering time of 5 hours in the case of the monomer solution and of the preliminary emulsion and for a metering time of 6 hours in the case of the initiator solution II.

A finely divided dispersion having a solids content of 50.2% by weight and a monomodal particle size distribution resulted, the mean particle size being 172 nm. The copolymer had an ethylene content of 41% by weight and the glass transition temperature of the polymer resin (DSC) was $-26.5°$ C.; its K value (in THF) was 42.1.

EXAMPLE 2

Graft Polymerization after Pretreatment with 5% by Weight of Hydrogen Peroxide 1,070 g of the EVA dispersion from Example 1, 61.6 g of a 35% strength $H_2O_2$ solution and 2.08 g of potassium persulfate were initially taken in a 3 glass flask having an internal, thermometer, a reflux condenser and a stirrer and were stirred for 2 hours at room temperature. Thereafter, the mixture was heated to 65° C. After the temperature equilibrium had been reached, 1.65 g of the sodium salt of hydroxymethanesulfinic acid (Brüggolit), dissolved in 108 ml of water, and a preliminary emulsion consisting of 180 g of styrene, 2.88 g of Aerosol MA 80 and 125 ml of water were metered in over a period of 3 hours. The reaction was completed by stirring for one hour at 65° C.

A finely divided dispersion having a solids content of 43.3% by weight and a monomodal particle size distribution resulted, the mean particle size being 192 nm. The particulate graft polymer had two phases and the glass transition temperatures (DSC) were −25.1° C. and +101.8° C.; the K value (in THF) was 42.1. The residual monomer content was determined as 0.88% by weight.

EXAMPLE 3

Graft Polymerization after Pretreatment with 10% by Weight of Hydrogen Peroxide

The procedure was as in Example 2, except that 123 g of a 35% strength $H_2O_2$ solution were stirred into the initially introduced mixture.

A finely divided dispersion having a solids content of 44.3% by weight and a monomodal particle size distribution resulted, the mean particle size being 181 nm. The particulate graft polymer had two phases and the glass transition temperatures (DSC) were −26.0° C. and +102.3° C.; the K value (in THF) was 38.9. The residual monomer content was determined as 0.57% by weight.

COMPARATIVE EXAMPLE 1

Graft Polymerization Without Pretreatment with Hydrogen Peroxide

The procedure was as in Examples 2 and 3, except that no hydrogen peroxide was added before the grafting reaction.

A finely divided dispersion having a solids content of 43.1% by weight and a monomodal particle size distribution resulted, the mean particle size being 180 nm. The particulate graft polymer had two phases and the glass transition temperatures (DSC) were −25.1° C. and +100.1° C.; the K value (in THF) was 36.9. The residual monomer content was determined as 0.98% by weight.

Testing of performance characteristics:

Preparation of the test specimens:

For testing with regard to the product quality and processibility, the dispersions were coagulated by adding a 10% strength $CaCl_2$ solution and the resulting coagulum was filtered, washed and dried to give a white, free-flowing powder.

Processing was carried out initially on a laboratory roll mill at 170° C. The milled products were subsequently pressed at 170° C. and 10 MPa to give 1 mm thick sheets.

Test methods:

The sheets were used to determine the Shore A hardness according to DIN 53,505, the tensile strength and the elongation at break according to DIN 53,504 and the tear propagation strength according to DIN 53,515.

The results of the tests are summarized in Table 1.

TABLE 1

| Example | Shore A | Tensile strength [N/mm$^2$] | Elongation at break [%] | Tear Propagation strength [N/mm] |
| --- | --- | --- | --- | --- |
| Comp. Expl. 1 | 46 | 5.55 | 216 | 6.26 |
| Example 2 | 56 | 6.27 | 239 | 7.76 |
| Example 3 | 57 | 6.50 | 259 | 10.90 |

As shown in Table 1, an increase in the tensile strength by about 20% in conjunction with an elongation at break which is likewise increased by about 20% is achieved in the resulting moldings by the hydrogen peroxide treatment. The tear propagation strength improves by about as much as about 75%.

I claim:

1. A process for the preparation of a graft copolymer latex of core/shell dispersion particles having improved phase binding between core and shell in a twostage emulsion polymerization process, a latex based on one or more monomers selected from the group consisting of (meth)acrylates of alcohols having 1 to 14 C atoms, vinyl esters of saturated aliphatic carboxylic acids having 1 to 14 C atoms, olefins, vinyl aromatics, vinyl halides and vinyl ethers being prepared in the first stage, wherein
   a) hydrogen peroxide and a free radical initiator which decomposes into free radicals with a half-life of >48 hours at the temperature of the latex at the time of addition of the hydrogen peroxide are added to the polymer latex of the first stage simultaneously or in any order and
   b) in the second stage, this mixture is heated to a temperature at which the free radical initiator decomposes into free radicals with a half-life of <48 hours and/or a reducing agent is added and
   c) after the addition of the graft monomer phase which contains one or more ethylenically unsaturated monomers which form homopolymers having a glass transition temperature $T_g$ of >20° C., the latex polymer is grafted, optionally with further reducing agent.

2. A process as claimed in claim 1, wherein 0.1 to 20% by weight, based on the weight of the latex polymer of the first stage, of hydrogen peroxide are added.

3. A process as claimed in claim 1 wherein the addition of hydrogen peroxide is effected at a latex temperature of 20° to 40° C.

4. A process as claimed in claim 1 wherein, after the addition of the hydrogen peroxide, the mixture is allowed to stand or is stirred for a further 30 minutes to 12 hours in the stated temperature range.

5. A process as claimed in claim 1 wherein catalytic amounts of salts of heavy metals which may occur in a plurality of oxidation states are also added together with hydrogen peroxide.

6. A process as claimed in claim 1 wherein 0.001 to 0.01% by weight, based on the latex polymer, of an iron salt is added together with the hydrogen peroxide.

7. The process as claimed in claim 6 wherein the iron salt is iron II sulfate.

8. A graft copolymer latex prepared by a process as claimed in claim 1 wherein the core thereof consists of crosslinked, elastomeric polymers which contain vinyl acetate and ethylene or butyl acrylate and the shell is composed of styrene, methyl methacrylate and/or vinyl chloride.

9. A thermoplastic molding material comprise of the graft copolymer latex of claim 8.

* * * * *